United States Patent [19]
Kaufman et al.

[11] 3,731,531
[45] May 8, 1973

[54] MAXOMETERS (PEAK WIND SPEED ANEMOMETERS)

[75] Inventors: John W. Kaufman; Dennis W. Camp; Robert E. Turner, all of Huntsville, Ala.

[73] Assignee: The United States of America as represented by the Administrator of the National Aeronautics and Space Administration, Washington, D.C.

[22] Filed: Dec. 27, 1971

[21] Appl. No.: 212,165

[52] U.S. Cl. .................................................73/189
[51] Int. Cl. ............................................G01w 1/04
[58] Field of Search.....................73/189, 170, 228

[56] References Cited

UNITED STATES PATENTS 315,261   4/1885   Edwards..................................73/189
1,819,155   8/1931   Fales......................................73/189

*Primary Examiner*—Richard C. Queisser
*Assistant Examiner*—Stephen A. Kreitman
*Attorney*—L. D. Wofford, Jr.

[57] ABSTRACT

An instrument for measuring peak wind speeds under severe environmental conditions comprising an elongated cylinder housed in an outer casing. The cylinder contains a piston attached to a longitudinally movable guided rod having a pressure disk mounted on one projecting end thereof. Wind pressure against the pressure disk depresses the movable rod and thus the piston first against a low rate linear spring and thereafter at peak wind speeds against a high rate spring. When the wind reaches its maximum speed the rod is locked by a ball clutch mechanism in the position of maximum inward movement. Thereafter maximum wind speed or pressure readings may be taken from calibrated indexing means.

9 Claims, 4 Drawing Figures

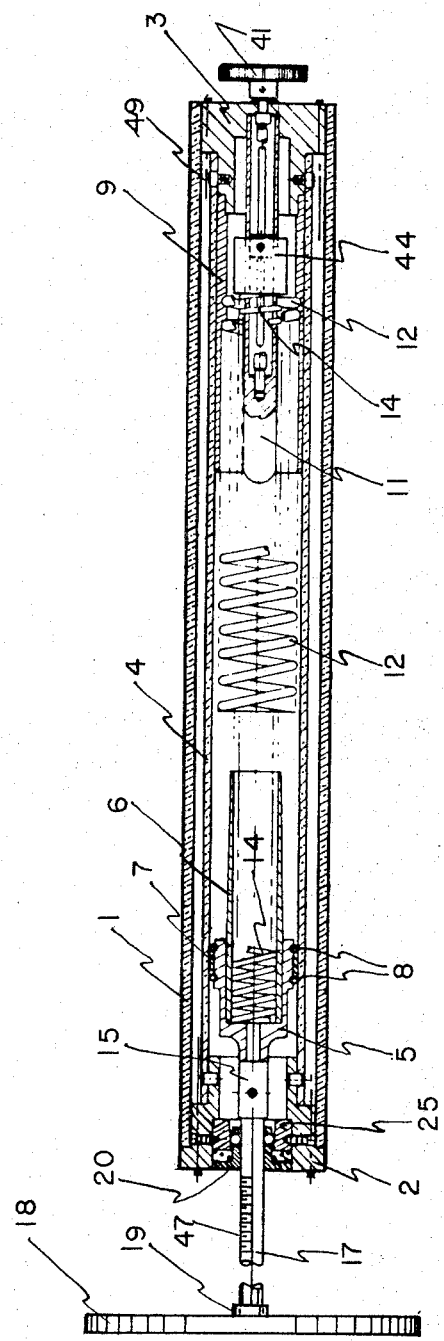
Fig. I

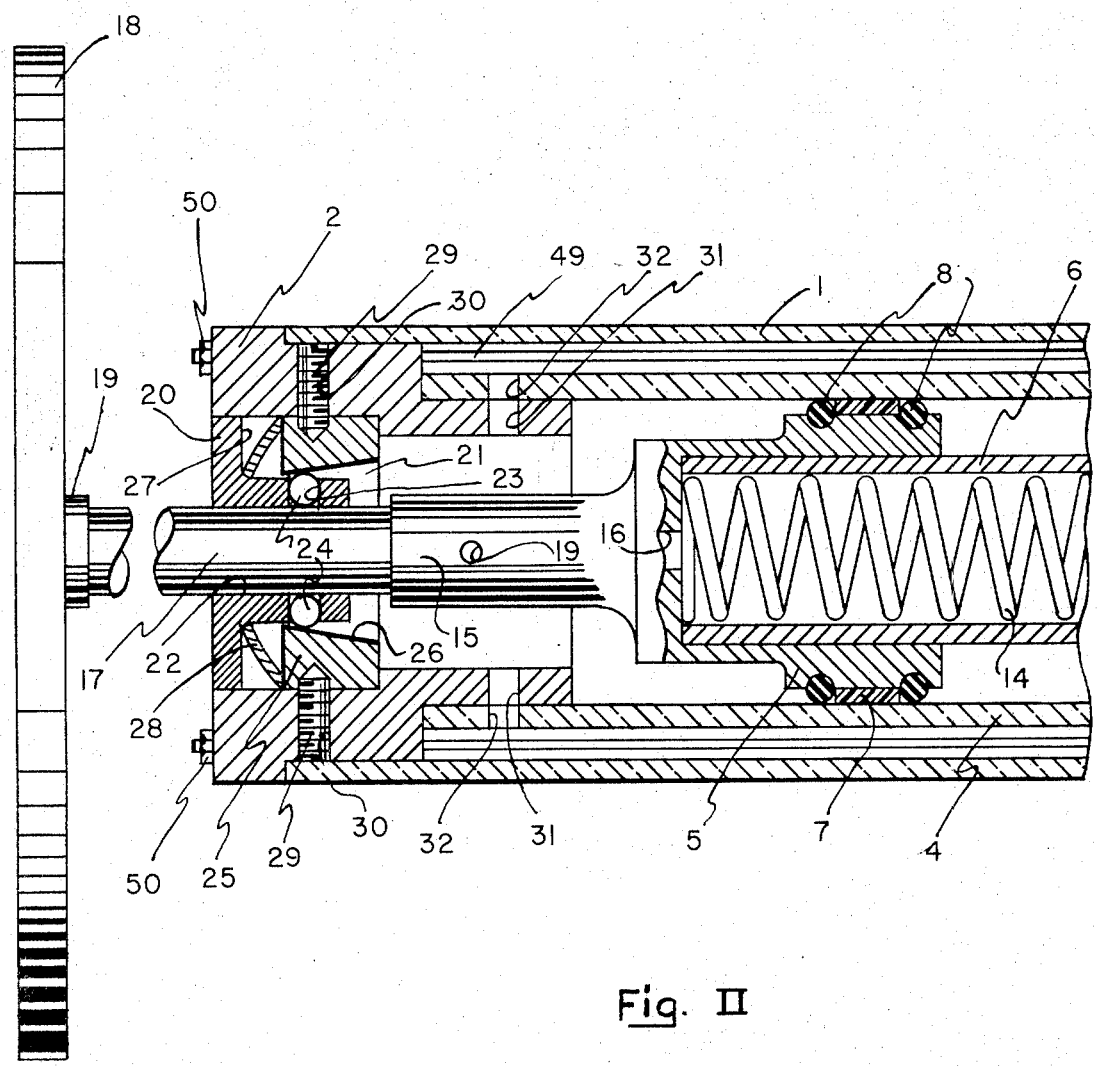
Fig. II

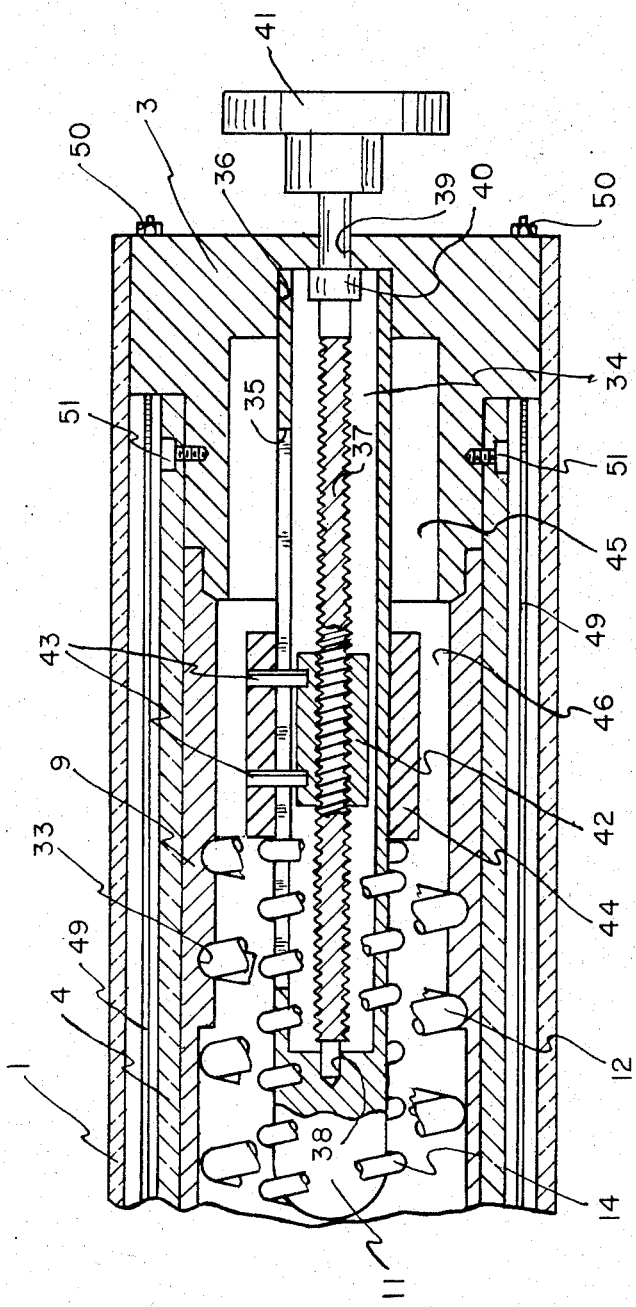
Fig. III

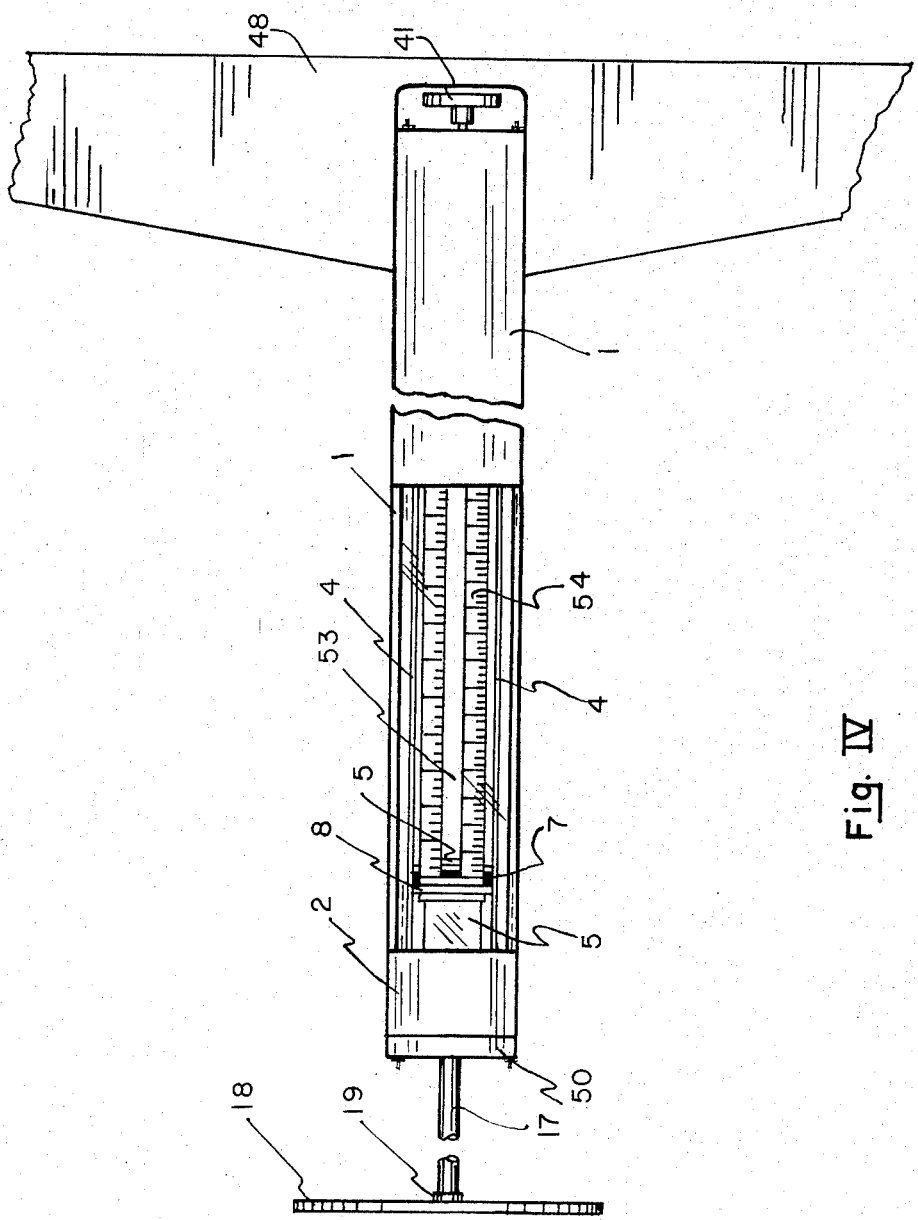
Fig. IV

MAXOMETERS (PEAK WIND SPEED ANEMOMETERS)

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The invention relates in general to devices, such as anemometers, for measuring peak wind speeds; and it deals more particularly with apparatus designed for use under severe environmental conditions, a maxometer capable of monitoring the peak winds induced in the vicinity of space vehicle launch towers and the surrounding terrain, as well as wind conditions caused by material phenomena, such as storms, hurricanes, and the like. The maxometer is capable of measuring the peak-induced winds and maintaining a recording of this reading after the instrument has been thus exposed.

2. Discussion of Prior Art

Anemometers presently available for measuring peak wind speeds are not designed to withstand extreme environmental conditions, such as high flow rates and high temperatures; particularly those conditions present at the base of space vehicles at the launch pad and its vicinity, nor are they suitable for extreme wind speeds associated with hurricanes, tornadoes and severe thunderstorms. Conventional anemometers are destroyed under such conditions.

The prior art in this field is illustrated by the early U. S. Pat. No. 1,819,155 to Fales, covering an instrument for indicating velocity and direction of flow of fluid. This patent discloses the use of exposed pressure plates and linkage members mounted upon a sleeve movable along a guide rod. The forces upon the pressure plates are counter balanced by the urging of the plates through linkage to compress a low-rate linear spring, and then a high-rate linear spring, with a pointer, associated with a slidable collar thus moved to afford a direct reading upon an adjacent graduated scale. A pressure diaphragm can be used to transmit the reading by a suitable fluid medium to a remote observation point. The entire apparatus is exposed, as to its movable linkage, to the atmosphere and would be destroyed in the presence of extremes of heat or force of wind. There is no suggestion of means for fixedly recording at the instrument itself the peak or maximum force.

The earlier U. S. Pat. No. 315,261 to Edwards is illustrative of a conventional anemometer for the measurement of relatively low wind speeds. It comprises a vane structure supporting in a lengthwise slot a spindle slidably mounted in terminal bearings. The spindle carries a low-rate compression spring confined between a fixed collar near the forward end of the spindle and the face of the rear bearing. A disk on the forward end of the spindle is responsive to wind pressure to urge the spindle rearwardly against the force of the spring, and, by means of linkage, to move a pivoted pointer to register pressure on a graduated quadrant scale. Again this structure is such that its elements are barely covered by a primitive housing which provides little or no seal against the effects of extreme environmental conditions. Under high temperatures and peak wind speeds such as encountered at the base of a rocket launch, or under severe winds and rains such as those experienced in the vicinity of a hurricane or tornado, in either case, the instrument would be destroyed. No means of a fixed registration of the peak wind speed is either provided or suggested.

Therefore, it can be seen that there is a need for an instrument capable of withstanding severe environmental conditions, particularly those in connection with launchings for space exploration as well as for severe ground weather usage.

There is a need for an instrument adapted for use in launch areas, subjected to severe forces which cannot be sustained by present devices. Due to the flow in such areas of dangerous volatile gases, the structure must be one which will not in its operation produce any conditions which will result in fire or explosion. The instrument must be adapted for calibration for use at various angles. At the same time, in connection with severe ground wind readings, under corrosive atmospheric conditions, the recording scales must be so protected from their action that the instrument may be repeatedly used without frequent change of the scales.

SUMMARY AND OBJECTS OF INVENTION

Accordingly, it is a primary object of this invention to provide in a peak wind anemometer a structure which will be adapted for employment under those extremely severe conditions of usage to which such an instrument may be subjected in the wind streams and explosive forces present at the base of a launch pad for a space vehicle. A feature in connection therewith will be a unique construction capable of withstanding heat temperatures in the range of 1000° to 2000° F., and forces of thrust of the magnitude employed in the launching of such a vehicle, without resultant destruction of the instrument itself.

An essential object and feature, in such connection, will be to provide an instrument which will accept the peak wind speed forces, take a maximum reading, and hold this reading on a fixed indicator for later measurement recording.

Because such readings will be taken at many selected points within the flow paths of such forces, and at all possible angles for study, it is an object to provide such a sensitive apparatus as may be adjusted to compensate for the inherent factors of error which might be encountered in weight of the pressure disk itself at angles other than the horizontal. A zero calibration mechanism is provided as a feature to accommodate these conditions.

Finally, in the device designed for use in vicinity of rocket exhausts and the highly flammable gases and liquid oxygen in such areas, the elimination of possible sparking from friction or static electricity is essential. Accordingly an object and feature of the invention is to use materials and provide a structure which shall not require electrical means nor consist of rubbing surfaces which may generate static electricity.

At the same time, a further object is to provide a modification of the foregoing peak wind speed anemometer more particularly adapted for use in determining peak ground wind speeds from various directions where the structure is capable of withstanding severe weather conditions, while affording an easily read recording of such speeds. A feature in connection therewith is the provision of such a structure which may be pivotally mounted to weathervane into the wind, and from which a fixed reading of maximum wind speed may be taken and the apparatus easily reset for continued use.

BRIEF DESCRIPTION OF THE DRAWINGS

FIG. I is a cross sectional view of a MAXOMETER (peak wind anemometer) of the most severe environmental type, showing the interior details, with portions partly cut away for clarity of detail.

FIG. II is an enlarged or blown-up cross sectional view, partly cut away, of the forward end of FIG. I, showing in larger detail an embodiment of structure.

FIG. III is an enlarged or blown-up cross sectional view, partly cut away, of the rear end of FIG. I, showing in larger detail an embodiment of the structure with the calibration system.

FIG. IV is a pictorial view in elevation, partly cut away, showing an embodiment of the structure designed for use in pivotal mounting, as a less severe environmental type, for employment in measurement of extreme wind speeds due to weather conditions.

DETAILED DESCRIPTION OF THE INVENTION

Referring more particularly to the drawings, it will be seen that the apparatus as illustrated in FIGS. I, II and III is that designed for use under the most severe environmental conditions, such as at the launch pad for a space vehicle and will be subjected to extremes of heat, maximum peak wind speeds and abrasive forces; and operate in an atmosphere where sparking from static electricity must be eliminated. The outer casing in this instance must be impervious to light and heat and cannot be provided with a window for visual reading or observation of the inner elements as indicated in FIG. IV, which embodiment is an example of a type of design for use in ambient environments for readings to be taken of weather conditions. Nor would the severe environmental model be provided with a fin as shown in this last figure. At the same time, the ambient environmental model might eliminate the zero calibration mechanism if used under conditions where the weight of the pressure disk itself would not present a false reading.

For the sake of convenience in identification, we will refer to the severe environmental embodiment of the invention as Model S and the ordinary meteorological embodiment, as last illustrated, as Model E.

In the drawing, FIG. I, the apparatus is enclosed in a silicon glass ablative outer casing 1, which is provided with nose cap 2 at the forward end and an end closure 3 at the rear end of similar material. This is to protect against high temperatures in the range of 1000° to 2000° F. encountered in the blast area of a launch pad.

Within the casing, as positioned and held in place by the cap and closure, is a cylinder 4 of pyrex glass. This carries the piston 5, which may be of stainless steel, provided with a lengthwise extended spring guide tube 6 made of Rulon. The body of the piston is circumscribed by a graphite sleeve 7 which is positioned between a pair of O-rings 8, of the Parker Seal type.

At the rear of the cylinder 4, there is contained therein, by the closure 3, a lengthwise extending spring guide tube 9 which is press-fitted over a shoulder of the closure 3, as shown. The guide tube 9 has bores which correspond with a bore in the closure providing chambers for movement of the zero adjust calibration mechanism which will later be described.

Extending from the closure 3 inwardly through the spring guide tube, as indicated in FIG. III, is a hollow spring guide 11 which also carries the zero adjust mechanism. Threaded at its end into the guide tube 9 is a high rate linear spring 12 designed to be compressed under the maximum force exerted by movement of the piston 5. This high rate spring extends at full flexion toward the forward end of the instrument approximately one-half of the length of the cylinder 4, being fixed at its rearward end as indicated.

Extending the length of the cylinder, as shown in FIGS. I and III is a low rate linear spring 14, positioned within the spring guide tube 6 against the head of the piston 5, being in full flexion also within the core of spring 12 and slidably mounted on the spring guide 11 against the zero adjust mechanism. Low rate spring 14 is maintained under minimal compression at full flexion to allow for zero adjustment calibration.

The forward end of the piston 5 is secured by means of a connector 15 to a hardened steel rod 17 having at its outer end a pressure disk 18. The connector may be suitably threaded to receive the rod 17, and is provided with a bore 16 which communicates with a port 19. The rod 17 projects outwardly through a structure which provides both a seal from the environment for the inner parts of the instrument and a clutch mechanism to retain the inwardly urged rod against the balanced forces of the springs.

This clutch structure, in the embodiment shown, comprises an annular plug 20, designated as the ball cage, slidable inwardly in the chamber 21 of the nose cap 2, and having a bore 22 through which rod 17 projects. The ball cage 20 is designed with a flanged portion at the outer end sufficiently large enough to fill the bore chamber 21 of the nose cap, but remain slidable inwardly therein. The inner shank portion of the ball cage, having the bore 22, is provided with a series of six circumferentially located bored ball chambers 23 in which are positioned hard ceramic balls 24. These balls may move in their chambers, inwardly impinging upon the surface of the rod 17, and project outwardly from their chambers to contact a camming surface.

The camming surface is provided by means of an annular shaped cam member 25 having a forwardly converging bore or cam surface 26 against which the balls 24 will ride as the ball cage 20 reciprocates lengthwise of the rod 17.

With this structure, it can be seen that the outer flange and shank of the ball cage plug 20 forms with the forward edge of the cam member 25 a spring chamber 27 when the cage plug 20 is in the forward position as shown in FIG. II. The spring chamber 27 is therefore adapted to receive spring 28. This spring, in the embodiment shown, is a flattened, substantially hard flexing O-spring, which surrounds the annular outer circumference of the shank of the ball cage plug 20. The spring 28 constantly urges the plug 20 forward, causing the balls 24 to be cammed by the surface 26 inwardly against the surface of the rod 17.

Thus when the rod 17 is caused to move inwardly by pressure on the disk 18, the plug 20 moves inwardly against the spring 28. This results in the cam surface releasing the balls 24 in their hold upon the rod 17, but when the rod completes its inward movement the spring 28, constantly urging the ball cage in the forward position, causes the balls to be instantly cammed tightly against the rod 17 and prevent outward movement thereof. This fixes the rod in its position of maximum inward movement.

The cam member 25 is fixed in position against an inner shoulder of the nose cap 2, preventing forward movement by means of suitable recessed set screws 29 carried by threaded holes 30 in the nose cap, as shown.

As can also be seen in FIG. II, in the embodiment shown, the nose cap 2 is also provided with a bore 31 which aligns with a similar bore 32 in the cylinder 4.

Referring now to FIG. III, we can see that the high rate spring 12 is retained at its rearward end within the spring guide tube 9 by means of correspondingly pitched threads 33 in this tube. The zero adjust mechanism, which is primarily for use in the severe environmental Model S, depicted in its inner structure in FIGS. I, II and III, is unique in its design. It will be noted that the spring guide 11, located at the rear of the structure, has a lengthwise bore 34 provided with a key-way 35; and the guide is press fitted into a corresponding bore 36 in the closure 3.

Positioned axially within the guide 11 is a partially threaded rod 37 rotatably mounted in the forward end of the guide in a bore 38. The rod 37 is also rotatably mounted in a bore 39 in the closure 3, being maintained in position by a lock nut 40, and is provided at its outer end with an adjusting nut 41.

Carried on the rod 37 is a threaded collar 42 having a pair of inset pins 43 which project through the key-way 35. These pins 43 are also inset into an annular spacer collar 44 which is movably mounted on the guide 11.

As can be seen from FIG. III, the spacer collar 44 is only free in reciprocal movement, within the respective chambers 45 and 46 formed by bores in the closure 3 and spring guide tube 9, responsive to turning adjustment of the nut 41 and rod 37.

As before mentioned, the low rate spring 14 is maintained within the cylinder 4 in full flexion, with the piston 5 in its normal full forward position, under some slight compression with the rear end of the spring 14 against the forward face of the spacer collar 44.

In the severe environmental model of the invention (Model S) the rod 17, as indicated in FIG. I, is provided along its length with graduated marks 47 which correspond to readings, in appropriate units of measure, to peak wind speeds causing inward movement of the disk 18 and rod 17. These can be read by using the outer face of the ball cage plug 20 as a marking point.

In use at the base of a launch pad for a space vehicle, a number of instruments, as embodied in FIGS. I, II and III, would be employed to measure peak wind speeds at various points. These would be mounted at various positions on or near the pad, as well as on the gantry, for measurement of the flowing currents of forces exerted by the ascending vehicle. Since these forces are evident at many different angles, producing attendant accoustical effects, and it is desirable to measure the magnitude of forces at these angles, the instruments would be mounted accordingly. Any number of suitable stands or clamping means could be employed to attach this maxometer at the various points on the pad and gantry at predetermined and fixed angles for measurements. However, as soon as the longitudinal axis of the instrument is placed other than in a horizontal plane, there is need for zero calibration to bias the weight of the mass of moving parts, the disk, rod, piston, etc. in each attitude, since this weight would cause the pressure disk and rod 17 to be withdrawn or forced inwardly, off the initial mark, under zero wind conditions.

Normally, the low rate spring, as before mentioned, at full flexion is under slight compression against the forward end from the piston and against the rearward end from the spacer collar 44. Assuming that the instrument is oriented in any plane from the horizontal such that the pressure disk 18 is upward, the mass of the parts will themselves tend to move the rod 17 inwardly and further compress the low rate spring 14. Zero calibration with reference to the marks 47 on the rod 17 is accomplished by turning the adjustment nut 40 to move the spacer collar 44 forward until the first mark on the fully extended rod is aligned with the marking point.

Conversely, when the instrument is oriented in any plane from the horizontal such that the pressure disk is downward with the rod 17 fully extended, the mass of the disk and other parts, under the slight normal compression of the spring 14, will move the disk and rod outward. Zero adjustment may now be made by turning the adjustment nut 40 in the opposite direction, to move the spacer collar 44 rearward, relieving the normal compression on the spring 14 and the bias on the rod 17, to allow the same to move inwardly until the first mark on the fully extended rod is aligned with the marking point.

Due to the fact that the ball clutch mechanism always holds the rod in a fixed position, unless the balls 24 are cammed away from the rod as it moves inwardly to depress the ball cage plug 20 against the springs 28, it is necessary to simultaneously depress the ball cage plug 20 manually while making the zero calibration adjustment.

To protect this severe environmental instrument, Model S, from temperatures in the range from 1000° to 2000° F. and wind speeds created by thrust forces in millions of pounds, and to prevent the possibility of sparking from static electricity in operation of the instrument in environmental atmospheres of explosive gasses, special materials are used in construction. For example, a silicon glass ablative outer casing 1 and end closures 2 and 3 are utilized. The ball cage 20, spring guide tubes 6 and 9 and the closure spring guide tube can be made of Rulon J. These are also non-conductive materials. The cylinder 4 is of pyrex glass while the piston sleeve 7 is made of graphite, both to prevent any build up of static electricity from friction. The linear springs are of stainless steel and are made such that the low rate spring is responsive to smaller forces, while the high rate spring is reactive only to high rate forces.

In the severe environmental Model S, the ablative casing 1 may be press fitted over the nose cap 2 and closure 3. However, consideration must be given to expansion lengthwise under high temperatures. A retaining screw may be employed to retain the casing at the rear through the casing into the closure. On the other hand, we have provided two small rods 49 extending lengthwise through the instrument between the casing 1 and cylinder 4, retained at the ends of the cap 2 and closure 3 by means of nuts 50.

This type of assembly, with a suitable stainless steel rod 49 (for example, one of 440 C stainless steel) offers several advantages as a means of holding the ends of the glass cylinder 4 and compressed spring structure together. For one, it obviates the use of a retaining screw through the casing into the closure; but, more important, it eliminates the use of retaining screws 51 (shown purely for illustrative purposes) at the forward and rear end of the cylinder securing the glass cylinder to the end closure and nose cap. Under severe environmental temperatures in the 1000° F. range, and the very high stresses set up at peak wind speeds with maximum compression of the linear springs by inward movement of the disk rod, it has been found that almost every mounting produces radial and point loadings with the screws which fracture the glass. By the use of the tension rods 49, it has been found with this technique that the spring compressive loads are reacted by the rods; and the glass cylinder is free of localized tensile stresses and will be required to take only the compressive loads from rod pre-tension. These rods, which we have found under maximum spring displacement to be subjected to a stress of 4075 psi, can be made to have a tensile strength of 80,000 psi.

Other points of interest are noted in that the bores 31 and 32 can provide for an equalization of pressure in the air space resulting between the cylinder 4 and outer casing 1, and that within the cylinder in which the piston 5 is working. Of course, pressure behind the piston 5 can be relieved on inward movement through the bore 16 and port 19.

Referring more particularly to FIG. IV we have shown one illustrative example of what could be an embodiment of the invention for less severe environmental conditions, in ambient environments, for readings of peak wind speeds for meteorological conditions due to weather. This is referred to as Model E.

In this embodiment, it can be seen that modifications in the construction of the apparatus are possible due to the less severe conditions to which the instrument will be subjected. At the same time certain characteristics of the environment will dictate the use of different materials.

For example, the shape and form of the outer casing 1 of the instrument may be the same, that of an elongated cylinder housing the inner structural elements of the device. However, a fin 48 would be provided at the rear of the casing to provide the weathervaning capabilities to increase the peak wind speed regardless of direction. Since it is not anticipated that the casing in this embodiment would be subjected to the extremes of pressure and heat encountered by the Model S unit on a space vehicle launch pad, a modification may be made in the materials used in this outer casing. In this connection it has also been found that the hardened steel rod 17 is subject to a rod corrosion problem from exposure to salt air environment. Therefore it follows that we can, in the Model E unit, replace the bare steel rod with a ceramic coated rod of like designation, and take the measurement readings through a transparent glass panel 53 made a part of the casing 1. In this event, a graduated marked strip 54 is affixed to the outer surface of the glass cylinder 4 and measurements may be taken by using the end of the piston 5, or any other moving part on the piston assembly, as a suitable marker point.

Various types of mountings might be used with the Model E version of the maxometer. The rear of the casing 1 might be extended lengthwise for balance, with a fin mounted at the end, since the zero-calibration mechanism is not necessary in most applicable uses of the device, and there would be no necessity in such case for close access to the rear of the spring guides.

A suitable clamp around the casing can be pivotally mounted for horizontal movement on a stand, or the casing can be directly mounted in pivotal movement on a stand, either modification being employed to provide a weathervane effect under directional wind flow, with the minimum of friction and damping effect.

If the modification version for meteorological use, is to be employed in relatively low peak wind speeds screws might be employed, as indicated, in retaining the nose cap, cylinder and end closures in relative positions. However, if we go to measurement of speeds, for example, of tornado velocity, the stresses set up by the linear spring compression to maximum values would make necessary the use of the tension rod fastening for the closures. There might also be some need for measurements in other than a horizontal plane. To this end, it will be seen that the version of the maxometer shown in FIGS. I, II and III is easily adaptable to FIG. IV, (wherein indicia of the fastening means is omitted for clarity of illustration of the salient features).

Thus it will be seen that we have provided an instrument suitably adapted as a maxometer to measure peak wind speeds under the most severe environmental conditions and under ambient conditions. Wind speeds against the pressure disk depress the movable rod, the ball clutch mechanism being released upon inward movement. The piston compresses, first, the low rate linear spring, and, then at peak winds begins to compress the high rate spring. When the urging force of the wind reaches its maximum, the bias of the springs, with the ball cage clutch, cams the balls against the rod and fixes it in its attitude of maximum inward movement. Readings are taken along the rod, or on the graduated scales, corresponding to units of peak wind speed velocity or pressure.

From the foregoing it will be seen that the invention is well adapted to attain all of the ends and objects hereinabove set forth, together with other advantages which are obvious and which are inherent to the structure.

It will be understood that certain features of any subcombinations of the invention are of utility and may be employed without reference to other features and subcombinations. This is contemplated by and is within the scope of the claims.

As many possible embodiments of the invention may be made without departing from the scope thereof, it is to be understood that all matter set forth or shown in the drawings is to be interpreted as illustrative and not in a limiting sense.

Having thus described our invention, what is claimed is:

1. An instrument for measuring peak wind speeds of the character described comprising in combination:
   an elongated cylindrical outer casing member;
   a cylinder disposed in said casing member extending lengthwise thereof and in spaced relation therefrom;
   a nose cap and an end closure, affixed by retaining means to the forward and rearward ends of said casing, substantially sealing the same from the environment and supporting said cylinder in spaced relation to said casing;
   a piston reciprocally mounted in said cylinder, having a shaft projecting through an aperture in said nose cap and supporting a pressure disk plate responsive to wind pressure thereon;
   guided spring biasing means disposed in the cylinder and urging said piston forwardly in resistance to disk plate force;
   clutch means integral with said aperture and shaft allowing inward movement of said shaft responsive to wind pressure and fixing the same at the point of maximum pressure movement; and
   indexing means integral with said shaft and cylinder housing denoting a measure of wind pressure in connection with peak wind speeds.

2. An instrument as in claim 1, wherein said nose cap comprises an annular plug inserted in said casing member provided with a flange on the forward end thereof fitted over the end of said casing, said plug projecting inwardly and having an inner lengthwise bore therein for projection of said shaft and an outer shoulder fitting into said cylinder and yieldably supporting the same in spaced relation from said casing; and wherein said end closure comprises another annular plug circumscribed by and fitted into the rearward end of said casing member having an outer shoulder fitting into said cylinder and supporting the same in spaced relation from said casing.

3. An instrument as in claim 2, wherein the retaining means for said nose cap and end closure affixing the same to said casing member comprises at least two, oppositely positioned, lengthwise extending stress rods disposed between said cylinder and casing wall and projecting through said cap and closure with clamping means retaining the ends thereof, said rods being so disposed to absorb the compressive stresses of the spring biasing means and lengthwise expansion of the instrument components.

4. An instrument as in claim 1, wherein said spring biasing means disposed in said cylinder comprises:
   a substantially rearwardly extending coaxial tubular insert on said piston face providing a forward guide tube having an inner bore to receive compressable therein a coiled low rate linear spring, said forward guide tube having an outer surface to receive compressable thereon a coiled high rate linear spring;
   a substantially forwardly extending tubular projection fitted to said end closure providing an outer rear guide tube having an inner bore to receive compressable therein a coiled high rate linear spring;
   an axially extending inner rear guide tube of lesser diameter disposed within said outer rear guide tube affixed to said end closure and disposed to receive within the coils of said high rate spring a coiled linear low rate spring compressable thereon;
   a spacer collar disposed on said inner rear guide tube;
   a coiled low rate linear spring of diameter corresponding to and received by the bore of said forward guide tube and the surface of said inner rear guide tube, said spring extending in full flexion lengthwise of said cylinder in compressive contact with the face of said piston and the forward end of said spacer collar;
   a coiled high rate linear spring of diameter corresponding to and received by said outer rear guide tube affixed at its proximal end thereto, said spring surrounding said low rate spring and extending in full flexion lengthwise of said cylinder such a distance as to allow substantial compression of said low rate spring by the inwardly moving piston before contact of the distal end of the high rate spring with the piston face, and providing thereafter the combined compressive reactive force of both of said springs.

5. An instrument as in claim 4, wherein associated with said spring biasing means is a zero calibration mechanism comprising:
   in combination with said spacer collar movably mounted on said rear guide tube, a keyway through the surface of said guide tube;
   an axially disposed threaded rod extending through said guide tube, journaled in said tube at its forward end and extending with a projection through the end closure supporting an affixed adjusting nut;
   a correspondingly threaded collar carried on said rod having a pin connecting through said keyway to said spacer collar, such that when said nut is adjustably turned said spacer collar will cause reciprocal movement of the flexed low rate spring allowing the free falling piston and shaft to zero calibrate said indexing means.

6. An instrument as in claim 1, wherein said clutch means comprises:
   said nose cap having an aperture providing a lengthwise bore chamber having an inwardly disposed shoulder;
   an annular cam member positioned in said chamber and affixed against said shoulder having an outwardly converging bore, receiving said piston shaft projecting therethrough, and providing a cam surface;
   an annular ball cage plug member provided at its forward end with an out-turned flange reciprocally mounted in fitting relation in said bore chamber;
   said plug member having a bore receiving said piston shaft and a shank portion movable against said shaft within the bore of said cam member;
   said shank of the ball cage plug member being provided with a plurality of circumferentially disposed bores opposite said cam surface and having reciprocal therein, in contact with said cam surface and shaft, balls responsive to a forward movement of said shank to be cammed inwardly against said shaft preventing forward outward movement thereof, but responsive to inward movement of the shank to release the same; and an annular spring positioned between the flange of said ball cage plug member and face of said cam member constantly urging said ball cage plug member forward.

7. An instrument as in claim 1, wherein said indexing means comprises:
a plurality of graduate marks in spaced relation on said piston shaft corresponding to increments of wind pressure in terms of wind speed; and the forward edge of said nose cap constituting an indicator point in relation to said marks.

8. An instrument as in claim 1, for use in ambient environments, wherein the rearward end thereof is provided with fins responsive to orient said instrument and disk plate relative to wind direction to receive the maximum forces thereof.

9. An instrument as in claim 8, wherein the indexing means integral with said moving shaft and cylinder comprises:
a transparent cylinder allowing visual observation of an indicator point on said piston face;
a divided graduate scale having a lengthwise aperture for observation of the moving indicator point, said scale having marks in spaced relation thereon corresponding to increments of wind pressure in terms of wind speed; and
a transparent panel on said casing member corresponding with said scale for observation thereof.

* * * * *